United States Patent [19] [11] 3,922,534
Gerstenmeier et al. [45] Nov. 25, 1975

[54] METHOD AND ARRANGEMENT FOR MEASURING THE PULSE SEQUENCE FREQUENCY OF A PULSE SEQUENCE

[75] Inventors: Jurgen Gerstenmeier, Leimen; Wolfgang Korasiak, Ketsch, both of Germany

[73] Assignee: Teldix GmbH, Heidelberg, Germany

[22] Filed: Aug. 5, 1974

[21] Appl. No.: 494,858

[30] Foreign Application Priority Data
Aug. 7, 1973 Germany............................ 2339839

[52] U.S. Cl. ...... 235/151.32; 235/150.3; 303/21 BE
[51] Int. Cl.²............................................ G06F 15/20
[58] Field of Search ...... 235/151.32, 194, 195, 196, 235/150.3, 92 CP, 92 FQ, 92 T, 92 TF, 92 DM; 328/133, 144, 158, 160, 161; 307/220, 225, 229; 303/21 BE; 317/5

[56] References Cited
UNITED STATES PATENTS

| | | | |
|---|---|---|---|
| 3,510,772 | 5/1970 | Luthi | 235/194 X |
| 3,605,028 | 9/1971 | De Vries | 235/194 X |
| 3,662,159 | 5/1972 | Schief | 235/92 FQ X |
| 3,681,586 | 8/1972 | Kitaura | 235/194 X |

*Primary Examiner*—Joseph F. Ruggiero
*Attorney, Agent, or Firm*—Spencer & Kaye

[57] ABSTRACT

A method of measuring the pulse sequence frequency of a pulse sequence comprises counting pulses of a second pulse sequence of higher frequency during a time period related to the frequency of the first pulse sequence and varying the frequency of the second pulse sequence at least approximately in accordance with the reciprocal of the square of the time period. Also disclosed are an arrangement for carrying out the method and a braking system employing such a pulse frequency measurement.

26 Claims, 2 Drawing Figures 3,922,534

METHOD AND ARRANGEMENT FOR MEASURING THE PULSE SEQUENCE FREQUENCY OF A PULSE SEQUENCE

BACKGROUND OF THE INVENTION

The invention relates to a method and circuit arrangement for the measuring of the frequency of a pulse sequence.

It is known that the result of a measurement can be produced in the form of a pulse sequence, the frequency of the pulse sequence being proportional to the value being measured. This can be the case, for example, in the measurement of the speed, particularly the rotary speed, of a component, e.g. a vehicle wheel. With an inductive speed signal generator of known construction, a suitable pulse sequence can be produced. It is known to convert this pulse sequence into an analog direct voltage, the value of which is proportional to the frequency of the pulse sequence (Cf. e.g. German Laid—Open Pat. Application No. 2, 022 361 published Jan. 27th, 1972).

If the result of the measurement is required in digital form, the pulses can be counted in a predetermined measurement time. The resultant digital value is proportional to the speed.

However, in the case of this method of measurement, a relatively long time is required to determine the speed, since a series of pulses of the pulse sequence has to be counted. Such a long time is not available e.g. when the measurement is required for the control, for example, of antilock controllers of vehicles.

In order to reduce the measurement time, it is possible to measure the time period of a complete pulse cycle of the first pulse series (e.g. front flank of one pulse to front flank of next pulse). This can be effected by counting the pulses of a second, higher frequency pulse sequence during this time period. If the duration of the actual pulses of the first pulse sequence is at a fixed ratio to the time period of the complete pulse cycle (e.g. in the case of a meander-shaped pulse sequence), then the higher frequency pulses occurring in the pulse time can also be counted. Likewise, it is possible, for example, to count over two or more pulse periods. This advantageous method, as seen from the point of view of time consumption, however, has the disadvantage that the relationship between the digital value produced and the pulse sequence frequency is not linear, which causes difficulties.

SUMMARY OF THE INVENTION

Starting from the above mentioned method of measurement, it is an object of the invention to provide a method in which, in spite of measurement of the time period related to the frequency of the pulse sequence, a substantially linear relationship between the digital measurement result and the pulse sequence frequency can be obtained.

According to a first aspect of the invention, there is provided a method of measuring the pulse sequence frequency of a first pulse sequence comprising producing a pulse quantity in the duration of the period of a pulse of said first pulse sequence or a time dependent thereon using a second pulse sequence of higher frequency than said first pulse sequence and varying the pulse frequency of said second pulse sequence from an initial predetermined frequency during said period of a pulse of said first pulse sequence or a time dependent thereon according, at least approximately, to the reciprocal of the square of said period of a pulse of said first pulse sequence or a time dependent thereon.

According to a second aspect of the invention, there is provided a method of measuring the pulse sequence frequency of a first pulse sequence comprising determining a time period related to said pulse sequence frequency of said first pulse sequence, producing a second pulse sequence with a frequency higher than said frequency of said first pulse sequence, counting said pulses of said second pulse sequence during said time period and varying the frequency of said second pulse sequence at least approximately in accordance with the reciprocal of the square of said time period.

According to a third aspect of the invention, there is provided a device for measuring the pulse sequence frequency of a first pulse sequence comprising means for determining a time period related to said pulse sequence frequency of said first pulse sequence, generating means for generating a second pulse sequence with a higher frequency than said frequency of said first pulse sequence, counting means for counting said pulses of said second pulse sequence during said time period, and means for varying the frequency of said second pulse sequence at least approximately in accordance with the reciprocal of the square of said time period.

According to a fourth aspect of the invention, there is provided an antilock braking device for the brakes of a wheeled vehicle comprising a rotary speed signal generator driven by a wheel of said vehicle for producing a first pulse sequence of a frequency related to the rotary speed of said wheel, means for determining a time period related to said pulse sequence frequency of said first pulse sequence, a pulse generator for providing signals of variable frequency, a pulse counter for counting the pulses produced by said pulse generator to provide a value related to the rotary speed of said wheel, a gate open during said time period and positioned between said pulse generator and said counter, a control circuit responsive to the pulses arriving at said counter to vary said frequency of said pulse generator on the arrival of pulses at least approximately in accordance with the reciprocal of the square of said time period, comparison means for comparing said rotary speed related value with a reference value to produce a comparison value, and means responsive to said comparison value for controlling brakes associated with said wheel.

In the above mentioned aspects there is said that the pulse frequency of the second pulse sequence is varied according to the reciprocal of the square of the time period to be measured. This can be done by continuously varying the pulse frequency according to the reciprocal of the square of the time period. But the expression used shall also comprise the use of some pulse sequences with different pulse frequencies, whereby at any time within the time period to be measured one of these pulse sequences is used. In this case the single pulse sequences are used one after the other in such a manner, that at every time the number of pulses occurring during the time period to be measured does not differ from the number of pulses in the case of continuous frequency variation by more than a given small value.

BRIEF DESCRIPTION OF THE DRAWINGS

The invention will now be described in greater detail by way of example with reference to the drawings in which.

DESCRIPTION OF THE PREFERRED EMBODIMENTS

Figure 1:
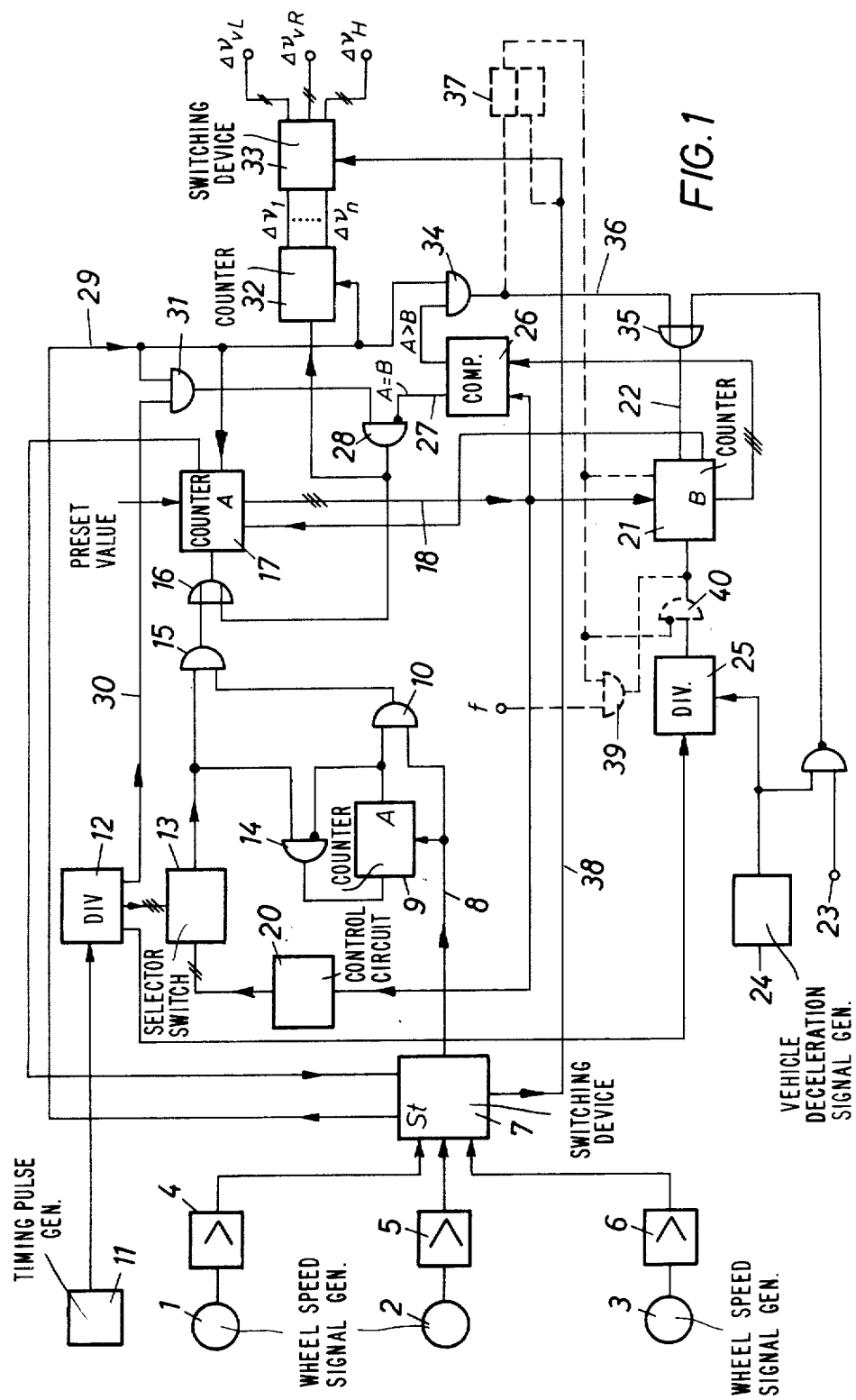
FIG. 1 is a circuit diagram of a first embodiment of the invention.

Basically the invention provides a method of measuring the pulse sequence frequency of a pulse sequence which comprises counting pulses of a second pulse sequence of higher frequency during a time period related to the frequency of the first pulse sequence and varying the frequency of the second pulse sequence at least approximately in accordance with the reciprocal of the square of the time period.

The linear relationship which is produced by this procedure can be represented by a straight line with a negative slope and displaced origin. Thus, here, the digital value increases as the pulse sequence frequency becomes smaller.

If the digital value is further subtracted from a predetermined fixed digital value, which can even be 0, a linear dependency is obtained in which case the digital value increases with the pulse sequence frequency. If a predetermined fixed value is selected to correspond to the highest possible digital value (corresponding to the smallest speed occurring), a relationship between the digital value and the pulse sequence frequency which is quite proportional results.

A variation in the pulse sequence frequency is necessary in the case of the solution in accordance with the invention. An exact result is obtained if the sequence frequency is varied continuously during the measurement time according to the expression ($1/T^2$). However, a good approximation to the linear relationship can also be achieved by using different discrete pulse sequence frequencies which are selected in dependence on the digital value or pulse quantity already accumulated at different points in time. In this case the number of pulses of the individual pulse sequence frequencies used can also be variable. The frequencies can be produced, for example, by means of frequency dividers, from a basic frequency, the divider ratio being designed to be variable. In this case it can definitely happen, if the number of discrete sequence frequencies is relatively small for economic reasons, that, at some point in time, a jump to a higher frequency for a few pulses is necessary for the correct approximation, for example, after a certain number of pulses of a particular frequency. The operation must, in toto, achieve the effect that the resultant number of pulses at every point in time within the time period does not deviate further from the number of pulses which would result from a continuous variation of the pulse sequence frequency corresponding to ($1/T^2$) than the permitted tolerance of the measurement.

The width of the required frequency spectrum is, where the same accuracy is required, dependent on the duration of the measurement time, that is to say, the time period. In accordance with a further development of the invention, with a predetermined maximal pulse sequence frequency of the first pulse sequence, no variation of the pulse sequence frequency of the second pulse sequence is undertaken from the start of the measurement time (time period) for a time period $t_o$ which corresponds to this predetermined maximal frequency of the first pulse sequence. Pulses of a single sequence frequency (second pulse sequence) can be produced in this time, and these pulses may be counted for the resultant digital value, wherein they can be taken into account in the formation of the difference; however, the pulses can also be prevented from being used in the digital value in this time $t_o$. By counting a predetermined number of pulses, the beginning of the time period from which the pulses are to be used in the digital value can be determined in a simple manner.

Preferably, a digital counter into which the pulses of the second pulse sequence are counted during the said time period is used for carrying out the method in accordance with the invention. If, in addition the difference formation is further carried out, then this counter is preferably operated in a backwards mode into which, in each case, the predetermined digital value is fed before the measurement pulses count down from this number and thus form the difference. If pulses of like frequency are counted into the counter in the time $t_o$, this constant number of pulses can be taken into account in the case of the preset digital value.

The digital value produced by the method in accordance with the invention and the circuit arrangements for carrying it out can, for example, be the instantaneous rotary wheel speed of a vehicle wheel. This information can be used in accordance with a further development of the invention for the control of the brake pressure at the vehicle wheels. In each case the maximal value of the digital values obtained at the different wheels is selected and stored for this purpose. The stored value serves as the reference value for determining wheel slip. The stored maximal value is either reduced at a predetermined rate which corresponds to a conventional vehicle wheel deceleration, or the reduction of the storage value is undertaken in dependence on the deceleration of the vehicle.

Then so-called slip signals are obtained by comparison of the digital values which are obtained from the individual wheels, with the stored value. These slip signals are used for the control of the brake pressure at the individual wheels.

Referring now to FIG. 1 of the drawings, showing a first embodiment of the invention, 1 and 2 are the speed signal generators for example electromagnetic generators which are associated with the two front wheels and which emit a pulse signal proportional to the rotary speed of the wheels. 3 is a similar signal generator associated with the rear axle. Amplifiers 4 to 6 are associated with these signal generators. A switch device 7 is, for example so constructed and controlled that it scans each of the three amplifier outputs in sequence and sequentially emits, at its output line 8, signals whose length T corresponds in each case to the time period of the three pulsed signals. This duration T is inversely proportional to the pulse frequency. Each of these signals first presets a counter 9 into its initial position, on the one hand, and, on the other hand, prepares an AND-gate 10.

A timing generator 11 generates a high frequency pulse sequence from which a series of different generated pulse frequencies is obtained in the divider 12. The different frequencies are fed to different outputs of the divider 12. At the start, a specific generated frequency is selected by a selector switch 13, which frequency is then fed to the counter 9 through an unblocked AND-gate 14. After the arrival of a predetermined number of pulses, which number is determined by a time interval $t_o$ and corresponds to the highest possible wheel rotary speed, the counter 9 emits an output signal which blocks the gate 14 and simultaneously permits a signal to appear at the output of the gate 10. As a result of this signal AND-gate 15 is opened for the pulses from the selector switch 13, which then pass to a backwards-forwards counter 17 through an OR-gate 16.

This counter 17 is used here as a backwards counter and is preset to a value corresponding to $f_T/f_o$, wherein $f_T$ is the highest possible generated frequency fed from the selector switch 13 and $f_o$ is the signal frequency of a speed signal generator at maximal vehicle speed. At a number of predetermined counting states of the counter 17, the selector circuit 13 is switched over by a conductor bundle 18 and control apparatus 20 such that, for a certain time, pulses of another generated frequency arrive at the counter 17. The frequencies and the number of the pulses at these frequencies are so selected that the number of pulses received at the counter at each point in time within the period $T - t_o$ while the gate 10 is open approximates, within specified tolerances, to the pulse quantity $$I = \frac{f_T}{f_o} - \frac{f_T}{f_o^2} f$$

(where f is the signal frequency from the wheels).

This figure results from calculation based on the premise that the frequency of the generated pulses arriving at the counter 17 varies in proportion to ($1/T^2$). Since the number of pulses (or the approximated number) is subtracted from the previously specified value $f_T/f_o$, the difference which is the digital value of the counter at the end of time T, (i.e. at the end of the measurement time) at which time the gates 10 and 15 are closed, corresponds to the value $(f_T/f_o^2) \cdot f$. Thus, the digital value in counter 17 is proportional to the signal frequency $f$.

The counted value is continuously transmitted in parallel into the counter 21 by way of a conductor bundle 18. Here, storage of the transmitted value is effected through line 22 as soon as the brake line switch of the vehicle passes a signal to the terminal 23 and, in addition, a predetermined low vehicle deceleration is detected by a vehicle deceleration signal generator 24. In order to match the stored reference value to the vehicle speed, pulses are fed to the counter 21, through a divider 25 which divides down a generated frequency from the divider 12, in a predetermined manner. With this input, the counter 21 acts as a backwards counter and slowly reduces the reference value. Preferably, the divider ratio of the divider 25 can be varied in accordance with the vehicle deceleration so that a reduction of the reference value which is matched to the frictional coefficient between the wheel and road surface.

The digital value present in the counter 17 and the reference value present in the counter 21 are compared in a comparator element 26. No signal is fed to the output line of the comparator 26 if the digital value of the reference value (counter 21) exceeds the digital value of the counter 17, that is to say when the associated wheel is lagging (i.e. slipping). In this case the AND-gate 28 is prepared for opening so that, during a short control pulse from the switch device 7 on the line 29 at the end of the time period T, pulses of certain frequency from the divider 12 pass by way of the line 30 and the AND-gates 31 and 28, to the counter 17, which is switched to forwards operation for the duration of the control pulse, and to a counter 32. The passage of the pulses is blocked as soon as the digital value in the counter 17 is increased by these pulses, to the extent that it has reached the digital reference value. The number of pulses which have arrived at the counter 32 thus relates to the slip value of the wheel. A signal can be produced at one of the output lines of the counter 32 ($\Delta v_1 - \Delta v_n$) corresponding to the slip value. This signal is fed through a switch device 33 operating synchronously with the switch device 7 to a wheel logic unit associated with the wheel in question for variation of the brake pressure at this wheel.

In the embodiment shown, it is also possible to match the reference signal to the instantaneous wheel speed value, if the wheel speed signal is larger than the reference value. In this case the comparator element 26 emits a signal which passes to the counter 21, during a control pulse on line 29, through the AND-gate 34 and OR-gate 35. Once there, it cancels the storage and thus permits the counter 21 to assume the larger digital value of the counter 17. After the end of the control pulse, the counter 17 must again be brought to its preset position in order to determine the speed of the wheel whose sensor has now been switched into circuit.

In order to eliminate short duration disturbances, or any overshoot, when determining the wheel speed, a slow matching can also be carried out instead of the immediate passage of the wheel speed value to the reference value counter 21. In this case the line 36 is interrupted and a storage element 37 in the form of a bistable trigger stage is provided which is switched over when a signal appears at the output of the element 34. It is reset only when the same wheel speed generator is switched into circuit by a corresponding signal on the line 38 associated with this wheel. The output signal of the storage element 37 produced at this time switches the counter 21 into its forward mode and permits a pulse sequence of predetermined generated frequency to arrive at the counter 21 through the AND-gate 39, the pulses of the divider 25 being simultaneously suppressed by means of gate 40. The digital value of the counter 21 is thus increased at a specified rate until the wheel which started the process is switched in again. The storage element 37 as well as the line 38 are provided separately for each signal generator 1 – 3.

Figure 2:
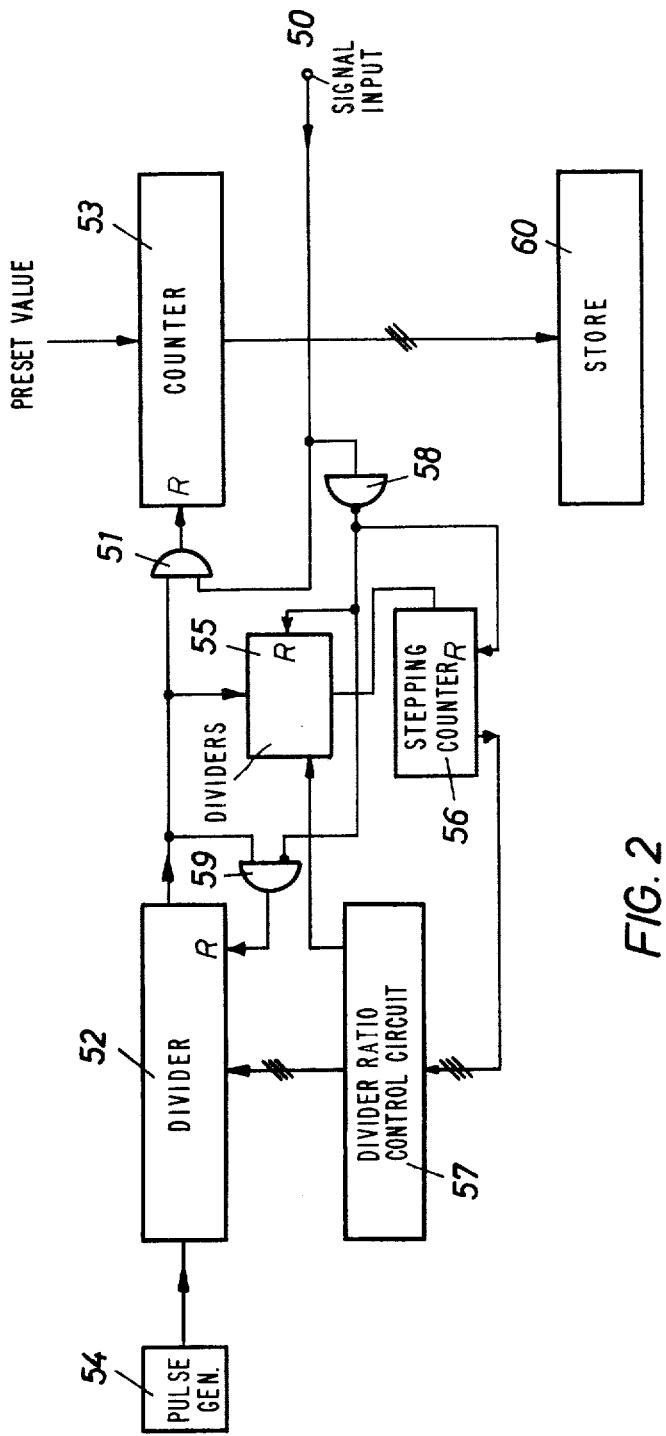
FIG. 2 is a circuit diagram of a second embodiment of the invention.

In the exemplary embodiment of FIG. 2, the signal representing the time period of the signal frequency is fed to the terminal 50. It prepares AND-gate 51 which thus permits the output signals of a divider 52 to arrive at a counter 53 operating in the backward mode and which contains a preset digital value. The divider ratio of the divider 52 to which the pulses of a pulse generator 54 are fed is adjustable. Each output pulse of the divider 52 during the time period resets the divider 52, constructed as a counter operating in the backward mode into the initial position (gate 59).

The pulses of the divider 52 are also fed to the divider 55, constructed as a counter, which divider also has an adjustable divider ratio. A stepping counter 56 is connected after the divider 55 and the output pulses of the divider 55 are fed to the stepping counter 56 which in its different states, sets the different divider ratios of the parts 52 and 55 through the control circuit 57.

This circuit operates as follows:

With the occurrence of the signal representing the time period T at the terminal 50, the gate 51 is opened for the pulses of the divider 52 and simultaneously the counters 55 and 56 are no longer held in their starting position by means of a negator element 58. In the starting position, a predetermined divider ratio is set for the dividers 52 and 55 by means of the control circuit. This divider ratio is retained up to the end of the time $t_o$ (corresponding to the maximal rotary speed) so that thus no frequency variation occurs in the period of time $t_o$. The pulse quantity arriving at this time at the counter 53, determined by divider 55, is taken into account in the preliminary setting.

After the expiry of the time $t_o$, a pulse steps on the stepping counter 56. The new position of the stepping counter now varies the divider ratio of at least the divider 55 by way of the switch device 57, so that now a number of pulses of a predetermined frequency, which number is determined by the new divider ratio, passes to the counter 53. The approximation to the number of pulses in the case of continuous frequency variations according to ($1/T^2$) is achieved by varying the sequence frequency of the pulses and the number of the pulses of the individual frequencies. After the termination of the pulse at the terminal 50, the result is transmitted from the counter 53 to the store 60 and is thus available for further processing.

It will be understood that the above description of the present invention is susceptible to various modifications, changes and adaptations.

What is claimed is:

1. A method of measuring the pulse sequence frequency of a first pulse sequence comprising producing a pulse quantity in the duration of the period of a pulse of said first pulse sequence or a time dependent thereon using a second pulse sequence of higher frequency than said first pulse sequence and varying the pulse frequency of said second pulse sequence from an initial predetermined frequency during said period of a pulse of said first pulse sequence or a time dependent thereon according, at least approximately, to the reciprocal of the square of said period of a pulse of said first pulse sequence or a time dependent thereon.

2. A method of measuring the pulse sequence frequency of a first pulse sequence comprising determining a time period related to said pulse sequence frequency of said first pulse sequence, producing a second pulse sequence with a frequency higher than said frequency of said first pulse sequence, counting said pulses of said second pulse sequence during said time period and varying the frequency of said second pulse sequence at least approximately in accordance with the reciprocal of the square of said time period.

3. A method as defined in claim 2, and comprising determining a digital value corresponding to said pulse sequence frequency and subtracting this value from a predetermined fixed digital value.

4. A method as defined in claim 3, wherein said predetermined fixed digital value is selected to correspond to the highest possible pulse number occuring at the lowest possible frequency of said first pulse sequence.

5. A method as defined in claim 1, and comprising varying the frequency of said second pulse sequence frequency only after a time period corresponding to the highest possible pulse sequence frequency of said first pulse sequence.

6. A method as defined in claim 5 and comprising counting said pulses of said second pulse sequence from the beginning of said time period.

7. A method as defined in claim 5 and comprising counting said pulses of said second pulse sequence only after a said time period corresponding to said highest possible pulse sequence frequency of said first pulse sequence.

8. A device for measuring the pulse sequence frequency of a first pulse sequence comprising means for determining a time period related to said pulse sequence frequency of said first pulse sequence, generating means for generating a second pulse sequence with a higher frequency than said frequency of said first pulse sequence, counting means for counting said pulses of said second pulse sequence during said time period, and means for varying the frequency of said second pulse sequence at least approximately in accordance with the reciprocal of the square of said time period.

9. A circuit arrangement for measuring the pulse sequence frequency of a first pulse sequence comprising means for determining a time period related to said pulse sequence frequency of said first pulse sequence, a pulse generator for providing signals of variable frequency, a pulse counter for counting the pulse produced by said pulse generator, a gate open during said time period and positioned between said pulse generator and said counter and a control circuit responsive to the pulses arriving at said counter to vary said frequency of said pulse generator on the arrival of a predetermined number of pulses at least approximately in accordance with the reciprocal of the square of said time period.

10. A circuit arrangement as defined in claim 9, wherein said pulse counter comprises a counter operating in backwards mode and presetting means are provided to preset said pulse counter to a predetermined digital value before counting.

11. A circuit arrangement as defined in claim 10, wherein said presetting means is adapted to preset said pulse counter to a digital value corresponding to the highest possible pulse number.

12. A circuit arrangement as defined in claim 9, and comprising a second pulse counter for receiving pulse of said second pulse generator during a said time period corresponding to the highest possible frequency of said first pulse sequence and connected to said gate for opening said gate when the number of pulses counted by said second pulse counter corresponds to said time period corresponding to said highest possible frequency of said first pulse sequence.

13. A circuit arrangement as defined in claim 9, wherein said pulse generator comprises a pulse signal generator of predetermined frequency and a frequency divider connected to said pulse signal generator for producing pulse signals of different pulse signal frequencies.

14. A circuit arrangement as defined in claim 13, wherein said frequency divider comprises a plurality of outputs each having a pulse sequence of different frequency.

15. A circuit arrangement as defined in claim 14, and comprising a selector switch controlled by said control circuit for selecting one of said plurality of outputs of said frequency divider.

16. A circuit arrangement as defined in claim 13, wherein said frequency divider comprises a divider with a variable divider ratio controlled by said control circuit in response to a predetermined number of pulses of said second pulse sequence.

17. A circuit arrangement as defined in claim 16, and comprising a second frequency divider with a variable divider ratio, a stepping counter connected to the output of said second frequency divider and control means responsive to said stepping counter for controlling the divider ratio of said first and second frequency dividers.

18. A circuit arrangement for measuring the rotary speed of a rotating component comprising a rotary speed signal generator for producing a first pulse sequence of a frequency related to the rotary speed of said rotating component, means for determining a time period related to said pulse sequence frequency of said first pulse sequence, a pulse generator for providing signals of variable frequency, a pulse counter for counting the pulse produced by said pulse generator, a gate open during said time period and positioned between said pulse generator and said counter and a control circuit responsive to the pulses arriving at said counter to vary said frequency of said pulse generator at least approximately in accordance with the reciprocal of the square of said time period.

19. An antilock braking device for the brakes of a wheeled vehicle comprising a rotary speed signal generator driven by a wheel of said vehicle for producing a first pulse sequence of a frequency related to the rotary speed of said wheel, means for determining a time period related to said pulse sequence frequency of said first pulse sequence, a pulse generator for providing signals of variable frequency, a pulse counter for counting the pulse produced by said pulse generator to provide a value related to the rotary speed of said wheel, a gate open during said time period and positioned between said pulse generator and said counter, a control circuit responsive to the pulses arriving at said counter to vary said frequency of said pulse generator at least approximately in accordance with the reciprocal of the square of said time period, comparing means for comparing said rotary speed related value with a reference value to produce a comparison value, and means responsive to said comparison value for controlling brakes associated with said wheel.

20. A device as defined in claim 19, and comprising a digital store for storing said rotary speed related value at the beginning of a braking operation to provide said reference value.

21. A device as defined in claim 20, and comprising means for discharging said digital store at a predetermined rate.

22. A device as defined in claim 20 and comprising means for discharging said digital store at a controllable rate.

23. A device as defined in claim 20, wherein said digital store comprises a backwards counter to which counting pulses are fed.

24. A device as defined in claim 20, and comprising a plurality of rotary speed signal generators driven by different wheels or axles of said vehicle and means for effecting storage in said digital store of a maximum rotary speed related value derived from said rotary speed signal generators.

25. A device as defined in claim 20 and comprising a digital comparator forming said comparison means and switch means for producing a value dependent on the difference between said rotary speed related value and said reference value.

26. A device as defined in claim 25, and comprising a gate circuit operative when said difference between said rotary speed related value and said reference value is positive to permit passage of pulses to said pulse counter and a further counter for determining wheel slip.

* * * * *